(12) United States Patent
Minoguchi et al.

(10) Patent No.: US 11,949,460 B2
(45) Date of Patent: Apr. 2, 2024

(54) OPTICAL COMMUNICATION SYSTEM, OPTICAL LINE TERMINATION APPARATUS AND OPTICAL COMMUNICATION CONTROL METHOD

(71) Applicant: Nippon Telegraph and Telephone Corporation, Tokyo (JP)

(72) Inventors: Kyo Minoguchi, Musashino (JP); Tomoaki Yoshida, Musashino (JP); Toshiaki Shitaba, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 62 days.

(21) Appl. No.: 17/776,263

(22) PCT Filed: Nov. 14, 2019

(86) PCT No.: PCT/JP2019/044638
§ 371 (c)(1),
(2) Date: May 12, 2022

(87) PCT Pub. No.: WO2021/095192
PCT Pub. Date: May 20, 2021

(65) Prior Publication Data
US 2022/0399942 A1    Dec. 15, 2022

(51) Int. Cl.
*H04B 10/04*       (2006.01)
*H04B 10/03*       (2013.01)
(Continued)

(52) U.S. Cl.
CPC ........... *H04B 10/564* (2013.01); *H04B 10/03* (2013.01); *H04B 10/272* (2013.01)

(58) Field of Classification Search
CPC .... H04B 10/564; H04B 10/03; H04B 10/272; H04B 10/27; H04B 10/0795; H04B 10/40;
(Continued)

(56) References Cited

U.S. PATENT DOCUMENTS

| 5,225,922 A | * | 7/1993 | Chraplyvy | ....... H04B 10/25073 398/94 |
| 6,157,475 A | * | 12/2000 | Dugan | ............. H04B 10/25073 398/1 |

(Continued)

FOREIGN PATENT DOCUMENTS

| JP | 2007221517 | 8/2007 |
| JP | 2009159189 | 7/2009 |
| JP | 2012114626 | 6/2012 |

OTHER PUBLICATIONS

Sugawa et al., "Development of OLT using Semiconductor Optical Amplifiers as Booster and Preamplifier for Loss-Budget Extension in 10.3-Gb/s PON system," Optical Fiber Communication Conference, OSA Technical Digest, 2012, 3 pages.

*Primary Examiner* — Hanh Phan
(74) *Attorney, Agent, or Firm* — Fish & Richardson P.C.

(57) ABSTRACT

An optical communication system includes an optical line terminal and a plurality of optical network units connected by optical transfer paths. The optical line terminal includes a light transmitting/receiving unit and a control unit. The light transmitting/receiving unit transmits/receives an optical signal to/from the plurality of optical network units via the optical transfer paths. The control unit performs control to change a launch power of an optical signal transmitted from the light transmitting/receiving unit, such that, when, regarding at least one optical network unit, a monitoring value has changed to a value indicating deterioration, a receive power of an optical signal in each of the plurality of (Continued)

optical network units is lower than or equal to an upper limit value and a receive power of an optical signal in the optical network unit in which the monitoring value has changed is higher than or equal to a lower limit value.

12 Claims, 6 Drawing Sheets

(51) Int. Cl.
*H04B 10/272* (2013.01)
*H04B 10/564* (2013.01)

(58) Field of Classification Search
CPC .......... H04B 10/2507; H04B 10/07955; H04B 10/572; H04J 14/0216; H04J 14/0245; H04J 14/0249; H04J 14/0252; H04J 14/0246; H04J 14/0247
USPC ....... 398/197, 196, 195, 162, 66, 67, 68, 69, 398/70, 71, 72, 79, 33, 38, 25, 26, 27, 34, 398/37, 160, 158, 159, 135, 136, 210
See application file for complete search history.

(56) References Cited

U.S. PATENT DOCUMENTS

| | | | |
|---|---|---|---|
| 7,233,432 B2 * | 6/2007 | Islam | H04J 14/0221 398/94 |
| 7,725,033 B2 * | 5/2010 | Nakamoto | H04J 14/0221 398/94 |
| 2009/0169209 A1 | 7/2009 | Sugawara et al. | |
| 2016/0056913 A1 * | 2/2016 | Furusawa | H04J 14/0223 398/7 |

* cited by examiner

| ONU NUMBER | RECEIVE POWER | RECEIVE POWER UPPER LIMIT VALUE | RECEIVE POWER LOWER LIMIT VALUE |
|---|---|---|---|
| #1 | $P_{receiving\#1}(t_n)$ | $P_{lim\_upper\#1}$ | $P_{lim\_lower\#1}$ |
| #2 | $P_{receiving\#2}(t_n)$ | $P_{lim\_upper\#2}$ | $P_{lim\_lower\#2}$ |
| ⋮ | ⋮ | ⋮ | ⋮ |
| #k | $P_{receiving\#k}(t_n)$ | $P_{lim\_upper\#k}$ | $P_{lim\_lower\#k}$ |
| ⋮ | ⋮ | ⋮ | ⋮ |
| #N | $P_{receiving\#N}(t_n)$ | $P_{lim\_upper\#N}$ | $P_{lim\_lower\#N}$ |

Fig. 6

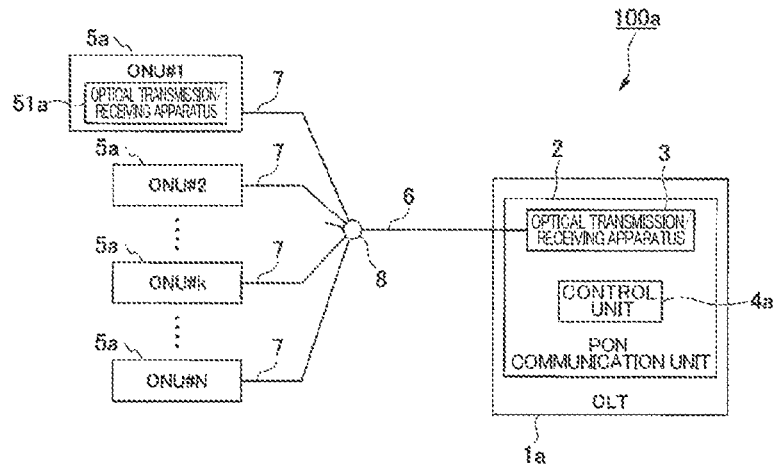

Fig. 7

|  | VALUE RECOGNIZED BY ONU | VALUE RECOGNIZED BY OPTICAL TRANSMISSION/RECEIVING APPARATUS | |
|---|---|---|---|
| ONU NUMBER | RECEIVE POWER | RECEIVE POWER UPPER LIMIT VALUE | RECEIVE POWER LOWER LIMIT VALUE |
| #1 | $P_{receiving\#1}(t_n)$ | $P_{lim\_upper\#1}$ | $P_{lim\_lower\#1}$ |
| #2 | $P_{receiving\#2}(t_n)$ | $P_{lim\_upper\#2}$ | $P_{lim\_lower\#2}$ |
| ⋮ | ⋮ | ⋮ | ⋮ |
| #k | $P_{receiving\#k}(t_n)$ | $P_{lim\_upper\#k}$ | $P_{lim\_lower\#k}$ |
| ⋮ | ⋮ | ⋮ | ⋮ |
| #N | $P_{receiving\#N}(t_n)$ | $P_{lim\_upper\#N}$ | $P_{lim\_lower\#N}$ |

Fig. 10

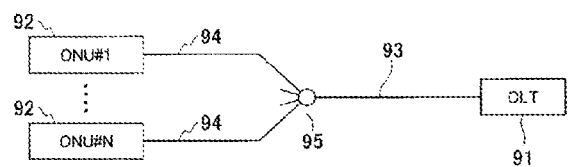

Fig. 11

| | ITEM | OLT | ONU |
|---|---|---|---|
| TRANSMIT | Average launch power (max) | 5 *1 | 9 *3 |
| | Average launch power (min) | 2 *1 | 4 *3 |
| RECEIVE | Average receive power (max) | −6 *2 | −10 *4 |
| | Receiver sensitivity (max) | −28 *2 | −28.5 *4 |

Unit: dBm

*1: See "10GBASE-PR-D3" in IEEE802.3av-2009 Table 75-5 "PR and PRX type OLT PMD transmit characteristics"

*2: See "10GBASE-PR-D3" in IEEE802.3av-2009 Table 75-6 "PR type OLT PMD receive characteristics"

*3: See "10GBASE-PR-U3" in IEEE802.3av-2009 Table 75-8 "PR type ONU PMD transmit characteristics"

*4: See "10GBASE-PR-U3" in IEEE802.3av-2009 Table 75-11 "PR and PRX type ONU PMD receive characteristics"

OPTICAL COMMUNICATION SYSTEM, OPTICAL LINE TERMINATION APPARATUS AND OPTICAL COMMUNICATION CONTROL METHOD

CROSS-REFERENCE TO RELATED APPLICATIONS

This application is a National Stage application under 35 U.S.C. § 371 of International Application No. PCT/JP2019/044638, having an International Filing Date of Nov. 14, 2019. The disclosure of the prior application is considered part of the disclosure of this application, and is incorporated in its entirety into this application.

TECHNICAL FIELD

The present invention relates to an optical communication system, an optical line terminal, and an optical communication control method.

BACKGROUND ART

An optical access system is an example of an optical communication system. FIG. 10 is a diagram showing a configuration example of an optical access system. The optical access system shown in FIG. 10 includes an OLT (Optical Line Terminal) 91 and ONUs (Optical Network Units) 92. The OLT 91 is on a communication operator side, and the ONUs 92 are on a service user side. The OLT 91 and the ONUs 92 function as transmitter/receivers. An optical transmitting/receiving apparatus is mounted in the OLT 91. N (N is an integer of 2 or more) ONUs 92 are physically connected to the optical transmitting/receiving apparatus via transfer path fibers 93 and 94, a separating splitter 95, and the like. In FIG. 10, the N ONUs 92 are indicated by ONUs #1 to #N. The transfer path fibers 93 and 94 are optical fibers.

10G-EPON (10 gigabit-ethernet (registered trademark) passive optical network) systems intended to be applied to optical access systems are standardized as IEEE802.3ay. In the 10G-EPON systems, it is possible to realize a communication speed of about 1 Gbps/10 Gbps (Gbps: gigabit per second) at maximum depending on an operation mode.

In a 10G-EPON system, transmitting/receiving performance of an OLT and an ONU is designated. FIG. 11 is a diagram showing this designated transmitting/receiving performance of an OLT and an ONU. When the OLT or ONU receives an optical signal whose receive power is lower than or equal to a designated value, communication connection is not ensured, and thus there is the possibility that communication service disconnection will occur.

As shown in FIG. 11, in the 10G-EPON system, difficult connection budget is designated for a downlink compared with an uplink. Therefore, when a loss is incurred on a path shared between an uplink and a downlink, it is highly likely that the downlink becomes a cause of disconnection. Note that "upstream" refers to a direction from an ONU to the OLT, and "downstream" refers to a direction from the OLT to an ONU.

Each ONU is equipped with a photodetector (PD). The photodetector is a light receiving element that converts an optical signal transmitted from the OLT into an electrical signal. There is the possibility that the photodetector will be damaged when it receives an optical signal of ultra-high power. If the photodetector is damaged, the ONU may cease functioning.

In addition, between the OLT and each ONU in the optical access system, there is a point at which a loss may be significant due to degradation over time. Examples of such a point include an optical splitter, an optical fiber fusion point, and the like. These points need to be taken into consideration for a long-term operation of even a path that has no problem when a communication service starts.

CITATION LIST

Non Patent Literature

[NPL 1] Jun Sugawa, Hiroki Ikeda, "Development of OLT using Semiconductor Optical Amplifiers as Booster and Preamplifier for Loss-Budget Extension in 10.3-Gb/s PON system", in Optical Fiber Communication Conference, OSA Technical Digest (Optical Society of America, 2012), paper OTh4G.4, 2012.

SUMMARY OF THE INVENTION

Technical Problem

There are cases where the receive power in an ONU decreases due to degradation over time of the optical transmitting/receiving apparatus in the OLT, the optical transmitting/receiving apparatus in the ONU, a transfer path fiber fusion point, an optical splitter, and the like. When the receive power in an ONU decreases, the receive signal quality decreases, and communication service disconnection occurs for some ONU users. In addition, also when the receiving sensitivity of the PD in the ONU deteriorates, receive signal quality deteriorates similarly, and communication service disconnection may occur. In view of this, it is conceivable that a transmission unit of the OLT is equipped with a semiconductor optical amplifier (SOA). As a result of the semiconductor optical amplifier amplifying a transmission signal, the receive power in the ONU can be increased. Accordingly, there is the possibility that some ONUs will recover from communication service disconnection while there is the possibility that other ONUs will break down due to the allowable receive power being exceeded.

With the foregoing in view, it is an object of the present invention to provide an optical communication system, an optical line terminal, and an optical communication control method that enable disconnection of a communication service to be suppressed.

Means for Solving the Problem

An aspect of the present invention is directed to an optical communication system that includes an optical line terminal and a plurality of optical network units connected by optical transfer paths, the optical line terminal includes a first light transmitting/receiving unit configured to transmit/receive an optical signal to/from the plurality of optical network units via the optical transfer paths and a control unit configured to perform control so as to change a launch power of an optical signal that is transmitted from the first light transmitting/receiving unit, such that, when it is recognized, for at least one optical network unit, that a monitoring value that changes according to a receive signal quality of an optical signal transmitted from the first light transmitting/receiving unit has changed to a value indicating deterioration, a receive power of an optical signal in each of the plurality of optical network units is lower than or equal to an upper limit value and a receive power of an optical signal in the optical network unit in which the monitor value has changed to a value indicating deterioration is higher than or equal to a lower limit value, and the optical network units each include a second light transmitting/receiving unit configured to transmit/receive an optical signal to/from the optical line terminal via the optical transfer paths.

An aspect of the present invention is directed to an optical line terminal that includes a light transmitting/receiving unit configured to transmit/receive an optical signal to/from a plurality of optical network units via optical transfer paths and a control unit configured to perform control so as to change a launch power of an optical signal that is transmitted from the light transmitting/receiving unit, such that, when it is recognized, for at least one optical network unit, that a monitoring value that changes according to a receive signal quality of an optical signal transmitted from the light transmitting/receiving unit has changed to a value indicating deterioration, a receive power of an optical signal in each of the plurality of optical network units is lower than or equal to an upper limit value and a receive power of an optical signal in the optical network unit in which the monitoring value has changed to a value indicating deterioration is higher than or equal to a lower limit value.

An aspect of the present invention is directed to an optical communication control method for an optical communication system that includes an optical line terminal and a plurality of optical network units connected by optical transfer paths, the method includes a transmitting/receiving step of transmitting/receiving an optical signal between a first light transmitting/receiving unit of the optical line terminal and second light transmitting/receiving units of the plurality of optical network units via the optical transfer paths, and a controlling step of performing control, by a control unit of the optical line terminal, so as to change a launch power of an optical signal that is transmitted from the first light transmitting/receiving unit such that, when it is recognized, for at least one optical network unit, that a monitoring value that changes according to a receive signal quality of an optical signal received by the second light transmitting/receiving unit from the first light transmitting/receiving unit has changed to a value indicating deterioration, a receive power of an optical signal in each of the plurality of optical network units is lower than or equal to an upper limit value and a receive power of an optical signal in the optical network unit in which the monitor value has changed to a value indicating deterioration is higher than or equal to a lower limit value.

Effects of the Invention

According to the present invention, it is possible to suppress disconnection of a communication service from occurring.

BRIEF DESCRIPTION OF DRAWINGS

FIG. 6 is a diagram showing a configuration example of an optical communication system according to a second embodiment.

FIG. 7 is a diagram showing information recognized by an OLT and ONUs according to the second embodiment.

FIG. 10 is a diagram showing a configuration example of an optical access system of a conventional technology.

FIG. 11 is a diagram showing designated transmitting/receiving performance of an OLT and an ONU.

DESCRIPTION OF EMBODIMENTS

Embodiments of the present invention will be described below in detail with reference to the drawings.

First Embodiment

Figure 1:
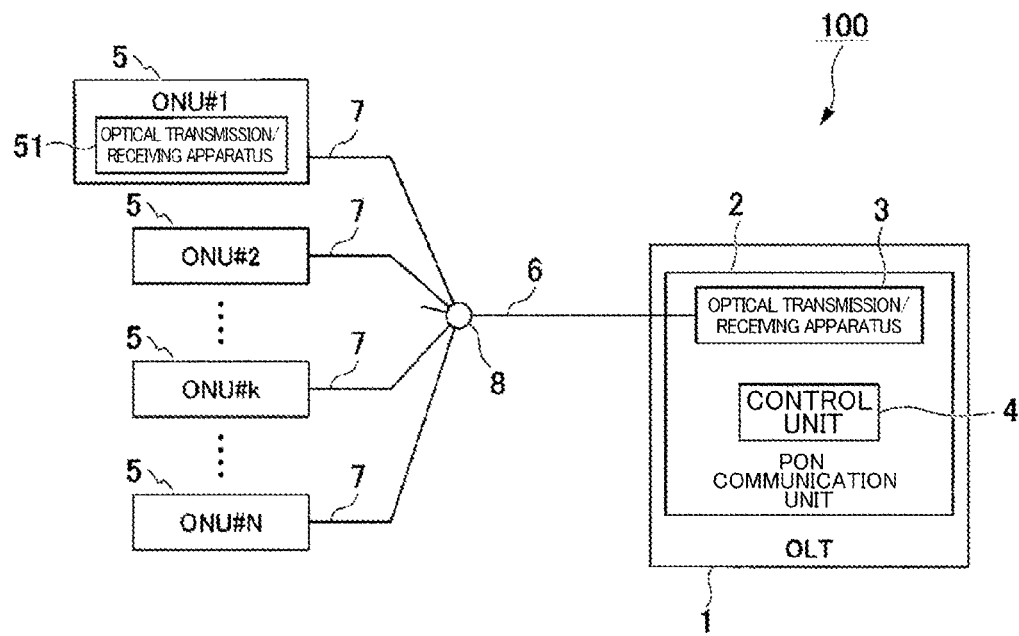
FIG. 1 is a diagram showing a configuration example of an optical communication system according to a first embodiment of the present invention.

FIG. 1 is a diagram showing a configuration example of an optical communication system 100 according to a first embodiment of the present invention. The optical communication system 100 is an optical access system that uses a PON (Passive Optical Network), for example. The optical communication system 100 includes an OLT (Optical Line Terminal) 1 and N (N is an integer of 1 or greater) ONUs (Optical Network Units) 5. In this embodiment, an ONU 5 whose ONU number is k (k is an integer of 1 to N) is also referred to as an "ONU #k". The OLT 1 and the ONUs 5 function as transmitter/receivers in the optical access system.

The OLT 1 and the N ONUs 5 are connected via optical transfer paths 6 and 7 and an optical splitter 8. The optical transfer paths 6 and 7 are single-mode optical fibers (SMFs), for example. The optical splitter 8 distributes a downstream optical signal transferred on the optical transfer path 6, to a plurality of optical transfer paths 7. In addition, the optical splitter 8 multiplexes upstream optical signals transferred on the respective optical transfer paths 7, and outputs the resultant to the optical transfer path 6.

The OLT 1 includes a PON communication unit 2. The PON communication unit 2 is a PON package, for example. The PON package is a case in which an optical transmitting/receiving apparatus 3 and a control unit 4 are mounted. The optical transmitting/receiving apparatus 3 transmits/receives optical signals to/from the ONUs 5 in accordance with predetermined specifications of the PON. The control unit 4 controls the optical transmitting/receiving apparatus 3. Note that the control unit 4 may be provided inside the optical transmitting/receiving apparatus 3, or may be provided outside the PON communication unit 2. In the following case, the control unit 4 controls the optical transmitting/receiving apparatus 3 so as to change launch power of a downstream optical signal. The case is a case where it is recognized that, regarding the one or more ONUS 5, some form of monitoring value that changes according to the receive signal quality of an optical signal transmitted from the optical transmitting/receiving apparatus 3 has changed to a value indicating deterioration. The monitoring value having changed to a value indicating deterioration indicates deterioration of the receive signal quality in the ONU 5. The control unit 4 performs control such that, in the N ONUS 5, the receive power of an optical signal is lower than or equal to an upper limit value, and, in any ONU 5 in which the monitoring value has reached a value indicating deterioration, the receive power of an optical signal is higher than or equal to a lower limit value.

Each ONU 5 includes an optical transmitting/receiving apparatus 51. The optical transmitting/receiving apparatus 51 transmits/receives an optical signal in accordance with the specifications of the optical transmitting/receiving apparatus 3 and the PON of the OLT 1. The optical transmitting/receiving apparatus 51 is equipped with a photodetector. The photodetector is a light receiving element that converts an optical signal transmitted from the OLT 1 into an electrical signal.

Figure 2:
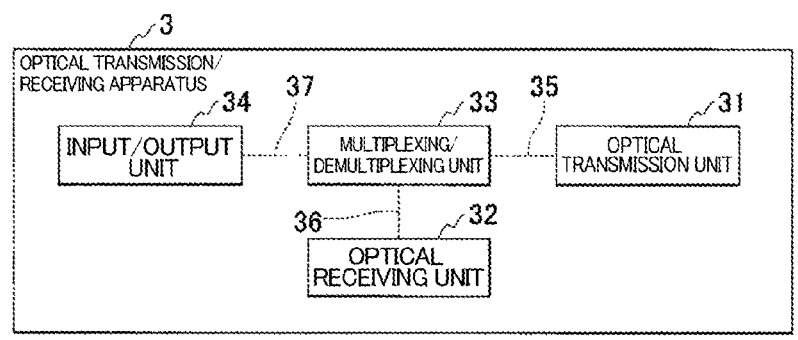
FIG. 2 is a block diagram showing the configuration of an optical transmitting/receiving apparatus according to the first embodiment.

FIG. 2 is a block diagram showing the configuration of the optical transmitting/receiving apparatus 3. The optical transmitting/receiving apparatus 3 that is mounted in the OLT 1 includes an optical transmission unit 31, an optical receiving unit 32, a multiplexing/demultiplexing unit 33, and an input/output unit 34. The optical transmission unit 31 and the multiplexing/demultiplexing unit 33 are connected by an optical waveguide unit 35, the optical receiving unit 32 and the multiplexing/demultiplexing unit 33 are connected by an optical waveguide unit 36, and the multiplexing/demultiplexing unit 33 and the input/output unit 34 are connected by an optical waveguide unit 37.

The optical transmission unit 31 is an optical transmitter. The optical transmission unit 31 converts an electrical signal on which a data signal is superimposed, into an optical signal. The optical transmission unit 31 transmits a downstream optical signal generated through this conversion, to the multiplexing/demultiplexing unit 33 via the optical waveguide unit 35. The optical receiving unit 32 receives an upstream optical signal from the multiplexing/demultiplexing unit 33 via the optical waveguide unit 36. The optical receiving unit 32 obtains the data signal superimposed on the optical signal by demodulating the received optical signal.

The multiplexing/demultiplexing unit 33 multiplexes or demultiplexes an optical signal transmitted from the optical transmission unit 31 or an optical signal to be received by the optical receiving unit 32, via the optical waveguide units 35 to 37. As a result of the multiplexing/demultiplexing unit 33 performing this multiplexing/demultiplexing, the downstream optical signal transmitted by the optical transmission unit 31 is output to the input/output unit 34, and the upstream optical signal received by the input/output unit 34 is output to the optical receiving unit 32.

The input/output unit 34 functions as an input/output end to/from a system made up of the optical transmission unit 31, the optical receiving unit 32, and the multiplexing/demultiplexing unit 33. The input/output unit 34 receives a downstream optical signal transmitted by the optical transmission unit 31, from the multiplexing/demultiplexing unit 33 via the optical waveguide unit 37. The input/output unit 34 outputs a downstream optical signal received from the multiplexing/demultiplexing unit 33, to the optical transfer path 6. In addition, the input/output unit 34 receives an upstream optical signal transferred on the optical transfer path 6. The input/output unit 34 outputs the received upstream optical signal to the multiplexing/demultiplexing unit 33 via the optical waveguide unit 37.

Figures 3, 4:
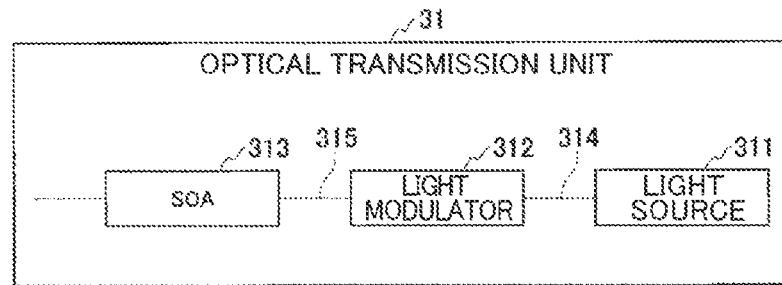
FIG. 3 is a block diagram showing the configuration of an optical transmission unit according to the first embodiment.
FIG. 4 is a diagram showing information that is recognized by an OLT according to the first embodiment.

FIG. 3 is a block diagram showing the configuration of the optical transmission unit 31. The optical transmission unit 31 includes a light source 311, a light modulator 312, and an SOA (Semiconductor Optical Amplifier) 313. The light source 311 and the light modulator 312 are connected by an optical waveguide unit 314, and the light modulator 312 and the SOA 313 are connected by an optical waveguide unit 315.

The light source 311 generates light. The light modulator 312 receives light generated by the light source 311, via the optical waveguide unit 314. The light modulator 312 modulates light generated by the light source 311, using an electrical signal on which a data signal is superimposed, thereby generating an optical signal on which the data signal is superimposed. The light modulator 312 outputs the generated optical signal to the SOA 313 via the optical waveguide unit 315. The SOA 313 amplifies the optical signal generated by the light modulator 312, and outputs an amplified optical signal. The optical transmission unit 31 outputs the optical signal output by the SOA 313, to the multiplexing/demultiplexing unit 33 via the optical waveguide unit 35. The SOA 313 changes a gain in accordance with control performed by the control unit 4.

With the above configuration, the optical communication system 100 performs downstream communication as described below. The light source 311 of the OLT 1 generates light of output power instructed by the control unit 4. The light modulator 312 modulates light generated by the light source 311, based on a data signal of an electrical signal, and generates an optical signal. The SOA 313 receives the optical signal generated by the light modulator 312 via the optical waveguide unit 315. The SOA 313 amplifies the received optical signal using a gain instructed by the control unit 4. The optical transmission unit 31 transmits the optical signal amplified by the SOA 313 to the multiplexing/demultiplexing unit 33 via the optical waveguide unit 35. The multiplexing/demultiplexing unit 33 transmits the optical signal received from the optical transmission unit 31 via the optical waveguide unit 35, to the input/output unit 34 via the optical waveguide unit 37. The input/output unit 34 outputs the optical signal received from the multiplexing/demultiplexing unit 33, to the optical transfer path 6. The optical splitter 8 distributes the optical signal transferred on the optical transfer path 6, to the optical transfer paths 7 respectively connected to the N ONUs 5. The optical transmitting/receiving apparatus 51 of each ONU 5 receives an optical signal transferred on the optical transfer path 7 connected thereto.

In addition, the optical communication system 100 performs upstream communication as follows. The optical transmitting/receiving apparatus 51 of each ONU 5 outputs an upstream optical signal to the optical transfer path 7 connected thereto. The optical splitter 8 multiplexes optical signals transferred on the respective optical transfer paths 7, and outputs the resultant to the optical transfer path 6. The input/output unit 34 of the OLT 1 receives the optical signal transferred on the optical transfer path 6, and transmits the received optical signal to the multiplexing/demultiplexing unit 33. The multiplexing/demultiplexing unit 33 receives the optical signal from the input/output unit 34, and transmits the received optical signal to the optical receiving unit 32. The optical receiving unit 32 converts the optical signal received from the input/output unit 34 into an electrical signal, and demodulates the electrical signal.

The control unit 4 of the OLT 1 controls launch power of a downstream optical signal by controlling one of or both output power of the light source 311 and the gain of the SOA 313. The control unit 4 recognizes some form of monitoring value that changes according to the receive signal quality in the optical transmitting/receiving apparatus 51 of each ONU 5, using a certain method. The ONU 5 periodically notifies the OLT 1 of the monitoring value thereof, for example.

Alternatively, the control unit 4 may make an inquiry about a monitoring value to each ONU 5. Upon receiving an inquiry, the ONU 5 notifies the OLT 1 of the monitoring value measured for the optical transmitting/receiving apparatus 51 thereof. Thus, the control unit 4 of the OLT 1 monitors the value of some type of index that changes in relation to the receive signal quality of each ONU 5. A case where a monitoring value decreases in accordance with a decrease in the receive signal quality will be described below as an example. Examples of such an index include the receive power in the optical transmitting/receiving apparatus 51 of the ONU 5.

When the control unit 4 recognizes that the monitoring value of at least one ONU 5 has decreased below a predetermined lower limit value, the control unit 4 controls power of a downstream signal such that the monitoring value in the ONU 5 increases. Specifically, the control unit 4 controls one of or both the gain of the SOA 313 and output power of the light source 311 in the optical transmission unit 31 of the optical transmitting/receiving apparatus 3. The control unit 4 controls power of an optical signal such that, in all of the ONUS 5 connected to the OLT 1 that is connected to an ONU 5 in which the monitoring value has increased to the lower limit value or higher, the monitoring value does not exceed the upper limit value, and is higher than or equal to the lower limit value. Note that, if the monitoring value increases as the receive signal quality decreases, when it is recognized that the monitoring value of at least one the ONU 5 has exceeded the predetermined upper limit, the control unit 4 controls power of a downstream optical signal such that the monitoring value of that ONU 5 decreases.

FIG. 4 is a diagram showing information recognized by the control unit 4 of the OLT 1. The control unit 4 recognizes the receive power, the receive power upper limit value, and the receive power lower limit value of each ONU 5. The receive power of the ONU #k at time $t_n$ is defined as $P_{receiving\ \#k}(t_n)$ The receive power upper limit value of the ONU #k is defined as $P_{lim\_upper\ \#k}$. The receive power lower limit value of the ONU #k is defined as $P_{lim\_lower\ \#k}$ Receive power upper limit values $P_{lim\_upper\ \#1}$ to $P_{lim\_upper\ \#N}$ may all be the same, some or all may be different, or they may be ∞ (infinite). In addition, the receive power lower limit values $P_{lim\_lower\ \#1}$ to $P_{lim\_lower\ \#N}$ may all be the same, or some or all may be different.

Figure 5:
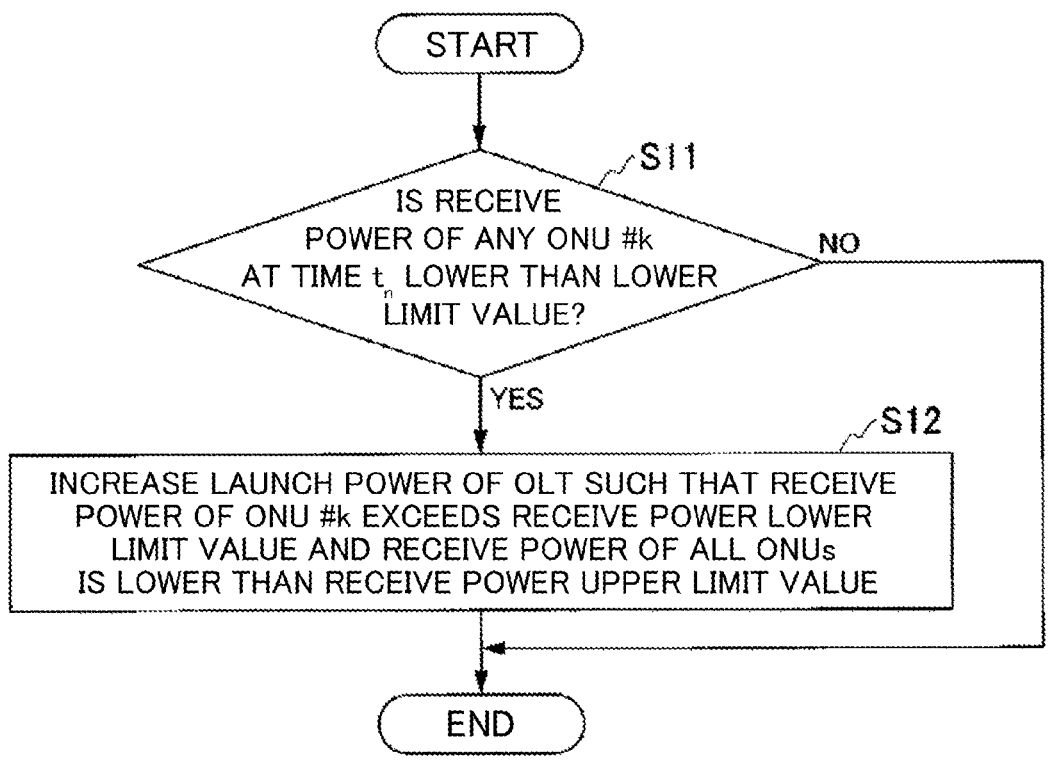
FIG. 5 is a flow chart showing launch power control processing that is performed by a control unit of the OLT according to the first embodiment.

FIG. 5 is a flow chart showing launch power control processing that is performed by the control unit 4. The control unit 4 may start launch power control processing shown in FIG. 5 periodically or after every predetermined time, or may start the processing after a predetermined time has elapsed from previous launch power control processing, for example.

Time is indicated by $t_n$, and the number of ONUS 5 is indicated by N. n and N satisfy Expression 1 below. In addition, the time $t_n$ satisfies Expression 2 below.

[Math. 1]

$$n, N \in \mathbb{N} \tag{1}$$

wherein ℕ is a set of natural numbers

[Math. 2]

$$t_n \in \{u_n | u_n \in \mathbb{N}, u_n < u_n + 1\} \tag{2}$$

wherein ℕ is a set of natural numbers

The control unit 4 recognizes whether or not the state at time $t_n$ is the state of Expression 3 below (step S11). That is to say, a determination is performed on whether or not the receive power in any ONU #k at time $t_n$ is lower than the receive power lower limit value of the ONU #k.

[Math. 3]

$$\exists k \in \mathbb{N} \ s,t \cdot 1 \leq k \leq N$$

$$P_{receiving\ \#k}(t_n) < P_{lim\_lower\ \#k} \tag{3}$$

When the control unit 4 recognizes that the state is not the state of Expression 3 (step S11: NO), the control unit 4 ends the processing in FIG. 5 without changing the control method of launch power of the optical transmitting/receiving apparatus 3.

On the other hand, when the control unit 4 recognizes that the state is the state of Expression 3 (step S11: YES), the control unit 4 performs control so as to satisfy Expressions 4 to 6 below at time $t_{n+1}$ (step S12). The launch power of the optical transmitting/receiving apparatus 3 at time $t_n$ is defined as $P_{transmitting}(t_n)$.

[Math. 4]

$$\forall k \in \mathbb{N} \ s \cdot t \cdot 1 \leq k \leq N$$

$$\exists q \in \mathbb{N}$$

$$P_{transmitting}(t_{n+1}) = P_{transmitting}(t_n) + q \tag{4}$$

$$P_{receiving\ \#k}(t_{n+1}) = P_{receiving\ \#k}(t_n) = q > P_{lim\_lower\ \#k} \tag{5}$$

$$P_{receiving\ \#k}(t_{n+1}) < P_{lim\_upper\ \#k} \tag{6}$$

As expressed by Expression 4, the control unit 4 controls one of or both the light source 311 and the SOA 313 such that the launch power $P_{transmitting}(t_{n+1})$ of the optical transmitting/receiving apparatus 3 at time $t_{n+1}$ changes from the launch power $P_{transmitting}(t_n)$ of the optical transmitting/receiving apparatus 3 at time $t_n$ by a real number q. At this time, as expressed by Expression 5, the receive power $P_{receiving\ \#k}(t_{n+1})$ of each ONU #k at time $t_{n+1}$ changes from the receive power $P_{receiving\ \#k}(t_n)$ of the ONU #k at time $t_n$ by the real number q. As expressed by Expressions 5 and 6, the control unit 4 determines the real number q such that, regarding every ONU #k, the receive power $P_{receiving\ \#k}(t_{n+1})$ of the ONU #k at time $t_{n+1}$ is higher than the receive power lower limit value $P_{lim\_lower\ \#k}$ of the ONU #k and lower than the receive power upper limit value $P_{lim\_upper\ \#k}$ of the ONU #k. As represented by Expression 5, the control unit 4 uses, as a control value, the difference between the receive power $P_{receiving\ \#k}(t_n)$ in the ONU #k and the receive power lower limit value $P_{lim\_lower\ \#k}$ The control unit 4 ends the processing in FIG. 5 after processing in step S12.

According the embodiment described above, the control unit 4 can prevent communication service disconnection from occurring while avoiding breakdown of all of the ONUS 5 subordinate to the optical transmitting/receiving apparatus 3 of the OLT 1 by appropriately controlling output power of the light source 311 and gain of the SOA 313 in the PON communication unit 2 mounted in the OLT 1. In other words, the PON communication unit 2 of the OLT 1 controls the gain of the SOA 313 and output power of the light source 311 such that, when the receive power of an ONU 5 has decreased below a predetermined lower limit value, the receive power of this ONU 5 increases to the lower limit value or higher, and the receive power of every ONU 5 does not exceed an upper limit value.

Second Embodiment

In the first embodiment, the control unit of the OLT obtains some form of monitoring value that changes according to the receive signal quality in an ONU using some type of method. In this embodiment, when an ONU detects that some type of monitoring value that changes according to the receive signal quality of the ONU has changed to a value indicating deterioration, the ONU notifies the OLT of the detected monitoring value. A description will be given below with a focus on the differences from the first embodiment.

FIG. 6 is a diagram showing a configuration example of an optical communication system 100a according to the second embodiment. The optical communication system 100a is an optical access system that uses a PON, for example. In FIG. 6, the same constituent elements as those of the optical communication system 100 of the first embodiment shown in FIG. 1 are given the same reference numerals, and a description thereof is omitted. The optical communication system 100a shown in FIG. 6 is different from the optical communication system 100 shown in FIG. 1 in that an OLT 1a and ONUS 5a are provided in place of the OLT 1 and the ONUS 5. In this embodiment, the ONU 5a whose ONU number is k (k is an integer of 1 to N) is also referred to as an "ONU #k". The OLT 1a and the ONUS 5a function as transmitter/receivers in the optical access system.

The OLT 1a shown in FIG. 6 is different from the OLT 1 shown in FIG. 1 in that a control unit 4a is provided in place of the control unit 4. When a notification that the receive power have decreased below the lower limit value is received from any ONU #i (i is an integer of 1 to N), the control unit 4a recognizes that the receive signal quality of an optical signal has deteriorated in the ONU #i. Upon receiving this notification, the control unit 4a makes an inquiry about receive power to another ONU #j (j is an integer of 1 to N, j≠i). The control unit 4a uses information regarding the receive power received from the ONUS 5a to perform control of the gain of the SOA 313 or the output power of the light source 311 such that, in any ONU 5a in which the receive power has decreased below the lower limit value, the receive power is higher than or equal to the lower limit value, and the receive power in every ONU 5a does not exceed the upper limit value, in a similar manner to the control unit 4 according to the first embodiment.

Each ONU 5a includes an optical transmitting/receiving apparatus 51a. The optical transmitting/receiving apparatus 51a transmits/receives an optical signal in accordance with the specifications of the optical transmitting/receiving apparatus 3 and PON of the OLT 1a. The optical transmitting/receiving apparatus 51 is equipped with a photodetector. The ONU 5a measures the receive power of an optical signal received by the optical transmitting/receiving apparatus 51a. The optical transmitting/receiving apparatus 51a of the ONU 5a may also measure receive power in a predetermined cycle, for example. In addition, a measurement unit (not illustrated) provided outside the optical transmitting/receiving apparatus 51a may also measure receive power. When the ONU 5a recognizes that the receive power has decreased below the lower limit value, or receives a request from the OLT 1a, the ONU 5a transmits receive power information indicating the measured receive power, from the optical transmitting/receiving apparatus 51a to the OLT 1a using an optical signal. When a request is received from the OLT 1a, the ONU 5a transmits the receive power measured at a time that is closest to the time when the request was received, or receive power information indicating the receive power measured after the request was received.

FIG. 7 is a diagram showing information recognized by the OLT 1a and the ONUs 5a. The OLT 1a recognizes the receive power upper limit values $P_{lim\_upper\ \#k}$ and the receive power lower limit values $P_{lim\_lower\ \#k}$ of the ONUs #k. In addition, each OLT #k recognizes the receive power $P_{receiving\ \#k}(t_n)$ measured therein at time $t_n$, the receive power upper limit value $P_{lim\_upper\ \#k}$ thereof, and the receive power lower limit value $P_{lim\_lower\ \#k}$ thereof. Note that the receive power upper limit values $P_{lim\_upper\ \#1}$ to $P_{lim\_upper\ \#N}$ may all be the same, some or all may be different, or they may be ∞(infinite). Also, the receive power lower limit values $P_{lim\_lower\ \#1}$ to $P_{lim\_lower\ \#N}$ may all be the same, or some or all may be different.

Figure 8:
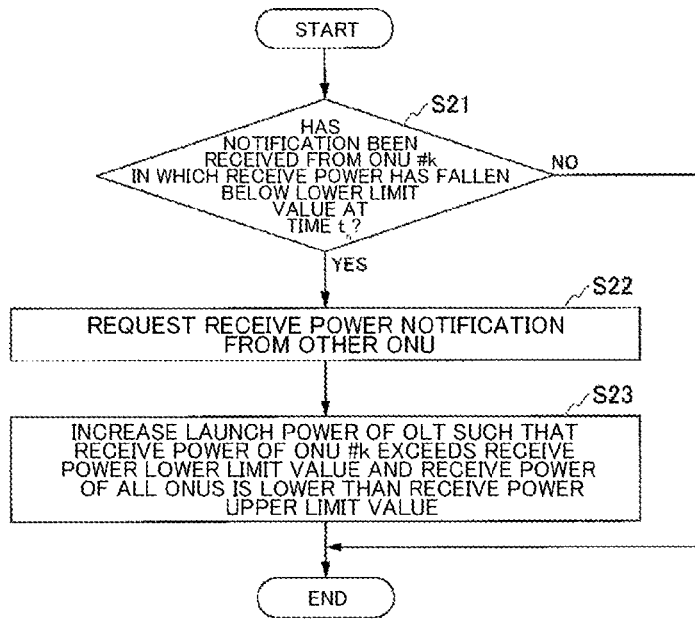
FIG. 8 is a flow chart showing launch power control processing that is performed by a control unit of the OLT according to the second embodiment.

FIG. 8 is a flow chart showing launch power control processing that is performed by the control unit 4a. The control unit 4a may start the launch power control processing shown in FIG. 8 periodically or after every predetermined time, or may start the processing after a predetermined time has elapsed from previous launch power control processing, for example.

Time is indicated by $t_n$, and the number of ONUs 5a is indicated by N. Similarly to the first embodiment, n and N satisfy Expression 1 above, and the time $t_n$ satisfies Expression 2 above.

An ONU 5a that has recognized the state of Expression 3 above at time $t_n$ transmits a notification of the receive power to the OLT 1a. The ONU 5a sets receive power information indicating the receive power $P_{receiving\ \#k}(t_n)$ at time $t_n$, in this notification. The control unit 4a determines whether or not a notification of the receive power has been received from any ONU 5a (step S21).

If it is determined that a notification of the receive power has not been received from any of the ONUS 5a (step S21: NO), the control unit 4a ends the processing in FIG. 8 without changing the control method of launch power of the optical transmitting/receiving apparatus 3.

On the other hand, if it is determined that a notification of the receive power has been received from at least one ONU 5a (step S21: YES), the control unit 4a performs the processing in step S22. The ONU 5a that has transmitted the notification of the receive power is referred to as an "ONU #i" (i is an integer of 1 to N). The control unit 4a obtains the receive power information from the notification of the receive power received from the ONU #i. The control unit 4a transmits a receive power notification request from the optical transmitting/receiving apparatus 3 to an ONU #j (j is an integer of 1 to N, j≠i) that is other than the ONU #i, using an optical signal. The ONU #j that has received the receive power notification request from the OLT 1a transmits receive power information indicating the receive power $P_{receiving\ \#j}(t_n)$ measured in the ONU #j, from the optical transmitting/receiving apparatus 51a to the OLT 1a using an optical signal. The control unit 4a of the OLT 1a receives the receive power information transmitted by the ONU #j, from the optical transmitting/receiving apparatus 3.

Upon receiving the receive power information from each ONU 5a, the control unit 4a performs control so as to satisfy Expressions 4 to 6 above (step S23), similarly to step S12 in the first embodiment.

That is to say, the control unit 4a controls one of or both the light source 311 and the SOA 313 such that the launch power $P_{transmitting}(t_{n+1})$ Of the optical transmitting/receiving apparatus 3a at time $t_{n+1}$ changes from the launch power $P_{transmitting}$ ($t_n$) of the optical transmitting/receiving apparatus 3a at time $t_n$ by the real number q. At this time, the receive power $P_{receiving\ \#k}$ ($t_{n+1}$) of each ONU #k at time $t_{n+1}$ changes from the receive power $P_{receiving}\#_k$ ($t_n$) of the ONU #k at time $t_n$ by the real number q. In view of this, the control unit 4a determines the real number q such that, for every ONU #k, the receive power $P_{receiving\ \#k}$ ($t_{n+1}$) of the ONU #k at time $t_{n+1}$ is higher than the receive power lower limit value $P_{lim\_lower\ \#k}$ of the ONU #k and lower than the receive power upper limit value $P_{lim\_upper\ \#k}$ of the ONU #k. After the processing in step S23, the control unit 4a ends the processing in FIG. 8.

According to the above embodiment, it is possible to prevent communication service disconnection in advance while avoiding breakdown of all of the ONUS 5a subordinate to the optical transmitting/receiving apparatus 3 of the OLT 1a, by appropriately controlling the light source 311 and the gain of the SOA 313 in the PON communication unit 2 while reducing a load on the OLT 1a more than the OLT 1 according to the first embodiment.

Next, an exemplary hardware configurations of the PON communication units 2 and 2a in the case where the control units 4 and 4a perform software processing will be described.

Figure 9:
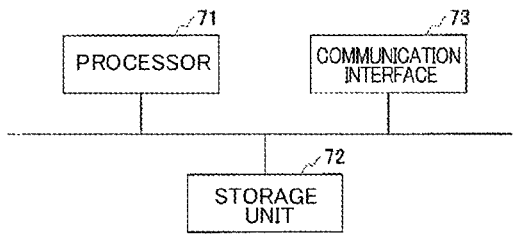
FIG. 9 is a diagram showing an exemplary hardware configuration of a PON communication unit according to the first and second embodiments.

FIG. 9 is a diagram showing an exemplary hardware configuration of the PON communication unit 2. The PON communication unit 2 includes a processor 71, a storage unit 72, and a communication interface 73. The processor 71 is a central computation device that performs computation and control. The processor 71 is a CPU (Central Processing Unit), for example. The storage unit 72 is a computer-readable recording medium. The storage unit 72 is any of various memories or a storage apparatus, for example. The storage unit 72 stores a program for the control unit 4 to execute processing, and the like. The processor 71 realizes the control unit 4 by reading out a program from the storage unit 72 and executing the program. The storage unit 72 includes a work area for when the processor 71 executes various programs, and the like. Some or all of the functions of the control unit 4 may also be realized using hardware such as an ASIC (Application Specific Integrated Circuit), a PLD (Programmable Logic Device), or FPGA(Field Programmable Gate Array). The communication interface 73 is equivalent to the optical transmitting/receiving apparatus 3.

The hardware configuration of the PON communication unit 2a is similar to the hardware configuration of the PON communication unit 2 shown in FIG. 9. However, in the case of the PON communication unit 2a, the storage unit 72 stores a program for the control unit 4a to execute processing, and the like. The processor 71 realizes the control unit 4a by reading out a program from the storage unit 72 and executing the program.

In the PON system, the receive signal quality may deteriorate due to degradation over time of the optical transmitting/receiving apparatus inside the OLT, the optical transmitting/receiving apparatus inside an ONU, the transfer path fiber fusion point, the optical splitter, and the like. In view of this, it is conceivable that, as a result of a transmission signal being amplified by the SOA provided in the OLT, the receive power in an ONU is increased so as to improve the receive signal quality. However, in accordance with this, there is the possibility that the allowable receive power will be exceeded in some ONU, and breakdown will occur. Therefore, it is necessary to appropriately control the SOA gain. According to this embodiment, the control unit mounted in the OLT can appropriately control the light source and the gain of the SOA. Therefore, it is possible to avoid breakdown of ONUS subordinate to the OLT transceiver, and prevent communication service disconnection in advance.

According to the embodiment described above, PON, namely a technique for constructing an optical access system, which is an example of an optical communication system, includes an optical line terminal and a plurality of optical network units connected by optical transfer paths. The optical line terminal is the OLT 1 or 1a, and the optical network units are the ONUs 5 or 5a, for example. The optical line terminal includes a first light transmitting/receiving unit and a control unit. The first light transmitting/receiving unit is the optical transmitting/receiving apparatus 3, for example. The first light transmitting/receiving unit transmits/receives an optical signal to/from the plurality of optical network units via the optical transfer paths. When it is recognized that, regarding at least one optical network unit, some form of monitoring value that changes according to the receive signal quality of an optical signal in the optical network unit transmitted from the first light transmitting/receiving unit has reached a value indicating deterioration, the control unit performs control for changing launch power of an optical signal that is transmitted from the first light transmitting/receiving unit such that, in a predetermined percentage or more or all of the optical network units, the receive power of an optical signal is lower than or equal to the upper limit value, and, in any optical network unit in which some form of monitoring value that changes according to the receive signal quality has reached a value indicating deterioration, the receive power of an optical signal is higher than or equal to the lower limit value. The optical network unit includes a second light transmitting/receiving unit. The second light transmitting/receiving unit transmits/receives an optical signal to/from the optical line terminal via the optical transfer path. The second light transmitting/receiving unit is the optical transmitting/receiving apparatus 51 or 51a, for example.

The first light transmitting/receiving unit includes a light source and an amplification unit. The amplification unit is the SOA 313, for example. The amplification unit amplifies an optical signal generated as a result of superimposing transmission data on light output from the light source. The control unit controls at least one of output power of the light source and the gain in the amplification unit, and thereby increases launch power of an optical signal that is transmitted from the first light transmitting/receiving unit.

Note that a value indicating the receive power of an optical signal in the second light transmitting/receiving unit of an optical network unit can be used as the monitoring value that changes according to the receive signal quality. The control unit may also use the difference between the receive power of an optical signal in an optical network unit and the lower limit value of receive power in the optical network unit, as a control value for changing launch power of an optical signal that is transmitted from the first light transmitting/receiving unit.

Although the embodiments of the present invention have been described in detail with reference to the drawings, specific configurations are not limited to these embodiments, and design or the like made without departing from gist of the present invention is also included in the scope of the present invention.

REFERENCE SIGNS LIST

1 OLT
1a OLT
2 PON communication unit
3 Optical transmitting/receiving apparatus 4 Control unit
4a Control unit
5 ONU
5a ONU
6 Optical transfer path
7 Optical transfer path
8 Optical splitter
31 Optical transmission unit
32 Optical receiving unit
33 Multiplexing/demultiplexing unit
34 Input/output unit
35 Optical waveguide unit
36 Optical waveguide unit
37 Optical waveguide unit
311 Light source
312 Light modulator
313 Semiconductor optical amplifier
314 Optical waveguide unit
315 Optical waveguide unit
51 Optical transmitting/receiving apparatus
51a Optical transmitting/receiving apparatus
71 Processor
72 Storage unit
73 Communication interface
91 OLT
92 ONU
93 Transfer path fiber
94 Transfer path fiber
95 Separating splitter
100 Optical communication system
100a Optical communication system

The invention claimed is:

1. An optical communication system that includes an optical line terminal and a plurality of optical network units connected by optical transfer paths,
the optical line terminal comprising:
an optical transmitting/receiving unit, including one or more processors, configured to transmit an optical signal to the plurality of optical network units or receive multiple optical signals from the plurality of optical network units via the optical transfer paths; and
a control unit, including one or more processors, configured to:
receive a monitoring value of the optical signal at a first optical network unit included in the plurality of optical network units, wherein the monitoring value changes according to a receive signal quality of the optical signal,
determine that the monitoring value has changed to a value indicating deterioration of the receive signal quality,
determine an adjust power value based on an upper limit value and a lower limit value for each of the plurality of optical network units, and
change a launch power of the optical signal based on the adjust power value to obtain a changed optical signal, such that, a receive power of the changed optical signal in each of the plurality of optical network units is lower than or equal to an upper limit value of the corresponding optical network unit and a receive power of the changed optical signal in the first optical network unit is higher than or equal to a lower limit value of the first optical network unit, and
the plurality of optical network units each comprising
a second optical transmitting/receiving unit, including one or more processors, configured to receive the optical signal and the changed optical signal from the optical line terminal or transmit one of the multiple optical signals to the optical line terminal via the optical transfer paths.

2. The optical communication system according to claim 1,
wherein the optical transmitting/receiving unit includes an optical source, and
an amplification unit, including one or more processors, configured to amplify an optical signal generated as a result of superimposing transmission data on optical output from the optical source, and
the control unit is configured to increase the launch power of the optical signal that is transmitted from the optical transmitting/receiving unit by controlling at least one of an output power of the optical source and a gain of the amplification unit.

3. The optical communication system according to claim 1,
wherein the monitoring value is a value indicating the receive power of the optical signal in the first optical network unit.

4. The optical communication system according to claim 3,
wherein the control unit is configured to use a difference between the receive power of the optical signal in the first optical network unit and the lower limit value of the receive power in the first optical network unit, as a control value for increasing the launch power of the optical signal that is transmitted from the optical transmitting/receiving unit.

5. An optical line terminal comprising:
an optical transmitting/receiving unit, including one or more processors, configured to transmit an optical signal to a plurality of optical network units or receive multiple optical signals from the plurality of optical network units via optical transfer paths, and
a control unit, including one or more processors, configured to:
receive a monitoring value of the optical signal at a first optical network unit included in the plurality of optical network units, wherein the monitoring value changes according to a receive signal quality of the optical signal,
determine that the monitoring value has changed to a value indicating deterioration of the receive signal quality,
determine an adjust power value based on an upper limit value and a lower limit value for each of the plurality of optical network units, and
change a launch power of the optical signal based on the adjust power value to obtain a changed optical signal, such that, a receive power of the changed optical signal in each of the plurality of optical network units is lower than or equal to an upper limit value of the corresponding optical network unit and a receive power of the changed optical signal in the first optical network unit is higher than or equal to a lower limit value of the first optical network unit.

6. The optical line terminal according to claim 5,
wherein the optical transmitting/receiving unit includes an optical source, and
an amplification unit, including one or more processors, configured to amplify an optical signal generated as a result of superimposing transmission data on optical output from the optical source, and
the control unit is configured to increase the launch power of the optical signal that is transmitted from the optical transmitting/receiving unit by controlling at least one of an output power of the optical source and a gain of the amplification unit.

7. The optical line terminal according to claim 5, wherein the monitoring value is a value indicating the receive power of the optical signal in the first optical network unit.

8. The optical line terminal according to claim 7, wherein the control unit is configured to use a difference between the receive power of the optical signal in the first optical network unit and the lower limit value of the receive power in the first optical network unit, as a control value for increasing the launch power of the optical signal that is transmitted from the optical transmitting/receiving unit.

9. An optical communication control method for an optical communication system that includes an optical line terminal and a plurality of optical network units connected by optical transfer paths, the method comprising:
transmitting, by an optical transmitting/receiving unit of the optical line terminal, an optical signal to the plurality of optical network units or receiving, by the optical transmitting/receiving unit, multiple optical signals from the plurality of optical network units, via the optical transfer paths,
receive, by a control unit of the optical line terminal, a monitoring value of the optical signal at a first optical network unit included in the plurality of optical network units, wherein the monitoring value changes according to a receive signal quality of the optical signal,
determining, by the control unit of the optical line terminal, that the monitoring value has changed to a value indicating deterioration of the receive signal quality,
determining, by the control unit of the optical line terminal, an adjust power value based on an upper limit value and a lower limit value for each of the plurality of optical network units, and
changing, by the control unit of the optical line terminal, a launch power of the optical signal based on the adjust power value to obtain a changed optical signal, such that, a receive power of the changed optical signal in each of the plurality of optical network units is lower than or equal to an upper limit value of the corresponding optical network unit and a receive power of the changed optical signal in the first optical network unit is higher than or equal to a lower limit value of the first optical network unit.

10. The optical communication control method according to claim 9, comprising:
amplifying an optical signal generated as a result of superimposing transmission data on optical output from an optical source; and
increasing the launch power of the optical signal that is transmitted from the optical transmitting/receiving unit by controlling at least one of an output power of the optical source and a gain of the amplification.

11. The optical communication control method according to claim 9, wherein the monitoring value is a value indicating the receive power of the optical signal in the first optical network unit.

12. The optical communication control method according to claim 11, comprising:
using a difference between the receive power of the optical signal in the first optical network unit and the lower limit value of the receive power in the first optical network unit, as a control value for increasing the launch power of the optical signal that is transmitted.

* * * * *